United States Patent [19]

Iwata et al.

[11] Patent Number: 4,953,413
[45] Date of Patent: Sep. 4, 1990

[54] DRIVING DEVICE HAVING A VIBRATOR

[75] Inventors: Koji Iwata; Shigeru Okuma, both of Nagoya; Yoshimasa Kimura, Yokohama; Yoshihiro Konata, Tokyo; Kiyoshi Kaneko, Yokohama, all of Japan

[73] Assignee: Canon Kabushiki Kaisha, Tokyo, Japan

[21] Appl. No.: 464,635

[22] Filed: Jan. 5, 1990

Related U.S. Application Data

[63] Continuation of Ser. No. 103,712, Oct. 2, 1987, abandoned.

[30] Foreign Application Priority Data

Oct. 6, 1986 [JP] Japan ................................. 61-237444
Oct. 8, 1986 [JP] Japan ................................. 61-237445

[51] Int. Cl.$^5$ ............................................. H01L 41/09
[52] U.S. Cl. ..................................... 74/1 SS; 310/317; 310/328
[58] Field of Search ................... 74/1 SS, 88; 310/328, 310/316, 317

[56] References Cited

U.S. PATENT DOCUMENTS 3,479,536 11/1969 Norris .................................. 310/328
3,515,911 6/1970 Byram et al. ........................ 310/328
4,195,243 3/1980 Thaxter ................................ 310/317
4,249,100 2/1981 Vasiliev et al. ..................... 310/328
4,422,002 12/1983 Binnig et al. ....................... 310/328
4,703,214 10/1987 Mishiro ............................... 310/328
4,727,278 2/1988 Staufenberger, Jr. et al. ..... 310/328
4,811,246 3/1989 Fitzgerald, Jr. et al. ........... 310/328

OTHER PUBLICATIONS

Feinwerktechnik & Messtechnik 87, (1979), Feinste Positionierungen mit Piezo-Antrieben, Von K. Spanner and L. Dietrich, pp. 181-183.

Primary Examiner—Leslie A. Braun
Assistant Examiner—Scott Anchell
Attorney, Agent, or Firm—Fitzpatrick, Cella, Harper & Scinto

[57] ABSTRACT

This specification discloses a driving device having a vibrator adapted to vibrate upon application of an electrical signal thereto, such as a piezo-electric element, and more particularly discloses a driving device in which a drive source having the vibrator is disposed on a base plate and the vibration force of the vibrator is transmitted to a contact surface such as a floor surface and the base plate is driven by the reaction force from the contact surface.

12 Claims, 6 Drawing Sheets

DRIVING DEVICE HAVING A VIBRATOR

This application is a continuation of application Ser. No. 103,712 filed Oct. 2, 1987, now abandoned.

BACKGROUND OF THE INVENTION

1. Field of the Invention

The present invention relates to a vibration type driving device.

2. Related Background Art

Driving devices in which a piezo-electric element is vibrated to drive a rotor are known from U.S. Pat. Nos. 4,548,090 and 4,325,264.

In these devices, a moving member cannot be driven in two-dimensional directions, and devices of the following types have been used as devices for driving the moving member in two-dimensional directions:

A device of the type in which guide rails parallel to the directions of two orthogonal axes (X-axis and Y-axis) on a planar surface are provided and the guide rail Y parallel to the Y-axis moves on the guide rail X parallel to the X-axis and a moving table moves on the guide rail Y in parallel to the Y-axis, whereby the moving table is moved on the planar surface in any direction, and a device of the type in which a moving table carrying a printing mechanism thereon moves on a guide rail parallel to the X-axis and printing paper is fed in a direction parallel to the Y-axis, whereby the moving table is moved in the directions of the X-axis and Y-axis relative to the printing paper.

The devices of the types as described above have been chiefly employed in printing apparatuses.

In these prior-art devices, however, the moving table can be moved only within a fixed range regulated by the guide rails, etc., and where they are used as printing apparatuses, it is necessary to mount a plurality of moving tables each carrying a printing mechanism thereon in order to improve the printing speed, and this has led to greater complexity of the mechanism.

As another method, there has been a plotter in which a drive source is comprised of a rotative driving member such as a tire or a caterpillar and a motor for driving it and a printing mechanism is carried on the drive source. This method, however, requires the driving mechanism to be made precisely and sturdily in order to accomplish highly accurate servo, and this has led to a disadvantage such as the heavy weight or high cost of the driving mechanism.

SUMMARY OF THE INVENTION

One aspect of the application is to provide a driving device in which a plurality of electro-mechanical energy converting elements are disposed in a base and a frequency signal is applied to said elements to vibrate them and the vibration forces thereof are transmitted to a fixed surface such as a floor surface, thereby moving the base in the combined direction of said vibration forces.

One aspect of the application is to provide a driving device in which electro-mechanical energy converting elements are disposed for different positions of a base, a frequency signal is applied to the elements to vibrate them, the vibration forces in the elements are transmitted in different directions of a fixed surface such as a floor surface to move said base in the combined direction of the vibration forces and further the vibration forces in the elements are arbitrarily adjusted to thereby move said base in any direction.

One aspect of the application is to accurately control the direction and speed of movement of the base under the above objects.

Other objects of the present invention will become apparent from the following detailed description of embodiments of the invention taken in conjunction with the accompanying drawings.

DESCRIPTION OF THE PREFERRED EMBODIMENTS

Figure 1A:
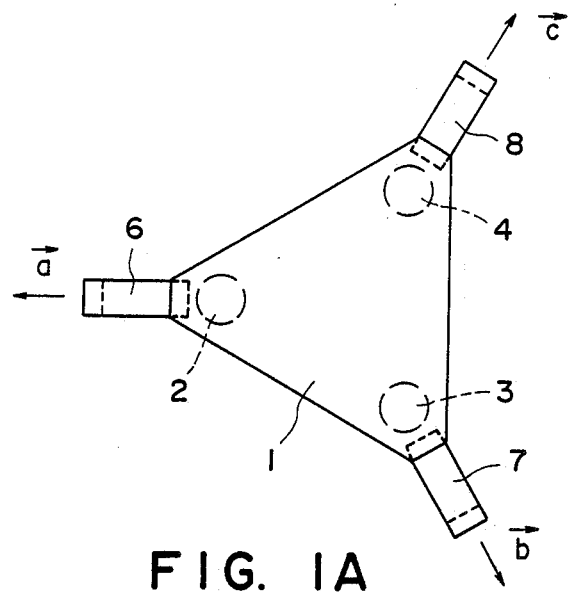
FIG. 1A is a plan view showing an embodiment of the construction of a driving device according to the present invention.
Figure 1B:
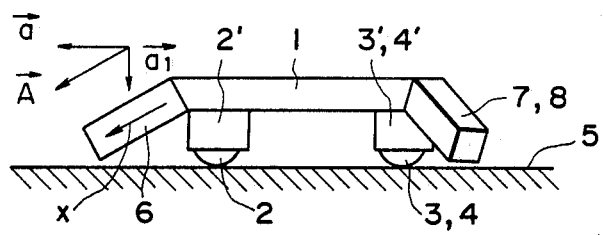
FIG. 1B is a front view of the FIG. 1A embodiment.

FIGS. 1A and 1B are plan view and a front view, respectively, showing the construction of an embodiment of a driving device according to the present invention. In these figures, reference numeral 1 designates a moving table on which three balls 2, 3 and 4 are rotatably mounted by means of ball receivers 2', 3' and 4' integral with the moving table 1. The moving table 1 is designed to be movable in all directions on a planar surface 5. As shown in FIG. 1A, drive sources 6, 7 and 8 are mounted on the respective vertices of the regular triangular moving table 1 with an angle of 120° formed therebetween. The drive sources 6, 7 and 8, as shown in FIG. 1B stretch in the lengthwise direction thereof, i.e., in X direction, and push the planar surface 5, whereby the moving table 1 is moved in reaction thereof. In FIG. 1B, arrow X is depicted only for the drive source 6, but this also holds true of the drive sources 7 and 8.

It is to be understood that the forces with which the drive sources 6, 7 and 8 stretch in the lengthwise directions thereof are represented by vectors $\vec{A}$, $\vec{B}$ and $\vec{C}$, that components parallel to the planar surface 5 are represented by vectors $\vec{a}$, $\vec{b}$ and $\vec{c}$ and that components perpendicular to the planar surface 5 are represented by vectors $\vec{a_1}$, $\vec{b_1}$, and $\vec{c_1}$, and description will hereinafter be made on the basis of such understanding.

In this case, the components which move the moving table 1 on the planar surface 5 are the components $\vec{a}$, $\vec{b}$ and $\vec{c}$ parallel to the planar surface 5.

Figure 2:
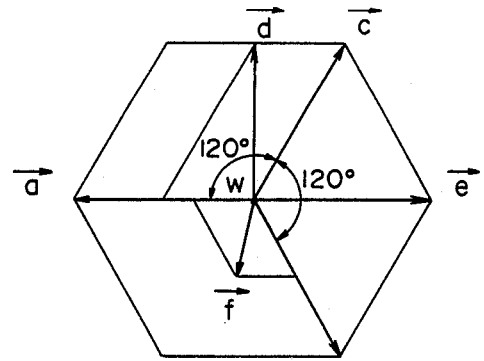
FIG. 2 illustrates a driving power for the moving table of FIG. 1.

FIG. 2 shows a state in which the vectors $\vec{a}$, $\vec{b}$ and $\vec{c}$ parallel to the planar surface 5 act on the center of gravity W of the moving table 1 while forming an angle of 120° with respect to one another. If the vectors $\vec{a}$, $\vec{b}$ and $\vec{c}$ are made to selectively act on the center of gravity W, the center of gravity W, i.e., the moving table 1, will be moved on the planar surface 5. For example, to move the center of gravity W to the right, if only the vector $\vec{a}$ is made to act thereon, the center of gravity W will be moved to the right as its reaction, and the acting force in that case is represented by $l\vec{a}$ obtained by multiplying the vector $\vec{a}$ by a constant l ($0 \leq l \leq 1$). Also, to produce a vector $\vec{d}$ in order to move the center of gravity W downwardly, $\frac{1}{2}\vec{a}$ and $\vec{c}$ may be combined together ($\vec{d} = \frac{1}{2}\vec{a} + \vec{c}$) to produce a vector $\vec{e}$ in order to move the center of gravity W to the left, $\vec{b}$ and $\vec{c}$ may be combined together ($\vec{e} = \vec{b} + \vec{c}$). To move the center of gravity W by a vector $\vec{f}$, $\frac{1}{2}\vec{a}$ and $\frac{1}{2}\vec{b}$ may be combined together ($\vec{f} = \frac{1}{2}\vec{a} + \frac{1}{2}\vec{b}$).

As described above, to move the center of gravity W by a certain vector $\vec{W}$, $\vec{a}$, $\vec{b}$ and $\vec{c}$ may be made to selectively act on the center of gravity by multiplying them by a certain constant. That is, $\vec{W}$ is represented by $\vec{W} = l\vec{a} + m\vec{b} + n\vec{c}$.

$$\begin{bmatrix} 0 \leq l, m, n, \leq 1 \\ l, m \text{ and } n \text{ are constants.} \end{bmatrix}$$

Thus the center of gravity W is driven in all directions on the planar surface 5 by a force of a magnitude in a regular hexagon including $\vec{a}$, $\vec{b}$ and $\vec{c}$ as vertices.

For example, laminated piezo-electric elements may be utilized as the drive sources 6, 7 and 8. The laminated piezo-electric elements utilize the reverse piezo-electric effect of creating mechanical strain when a voltage is applied to a certain kind of ceramics. When a voltage is applied to the drive sources 6, 7 and 8, they stretch in the direction of arrow X in FIG. 1 and the tip ends of the drive sources 6, 7 and 8 push the planar surface 5 and as its reaction, the moving table 1 is moved on the planar surface 5. When the voltage to the drive sources 6, 7 and 8 is released, the drive sources shrink and assume their original length. When no voltage is being applied to the drive sources, there is a slight gap between each drive source and the planar surface 5, and when a voltage is applied to the drive sources, the drive sources stretch and the tip ends thereof push the planar surface 5 and as its reaction, the moving table 1 is moved on the planar surface 5. To vary the forces produced by the drive sources, the voltage applied to the drive sources may be varied. Thereby, l, m and n in the aforementioned equation $\vec{W} = l\vec{a} + m\vec{b} + n\vec{c}$ can be varied and the moving table 1 can be moved in all directions at various speeds.

In the foregoing, description has been made of an embodiment in which balls 2, 3 and 4 are provided for smooth driving, but driving will be possible even if the balls are not provided.

Also, description has been made of a construction in which three drive sources are arranged with an angle of 120° formed therebetween, but the angle may be suitably selected depending on the construction of the whole. Also, the number of the drive sources may be more than three.

The structure of the tip ends of the drive sources 6, 7 and 8 will now be described.

Figure 6:
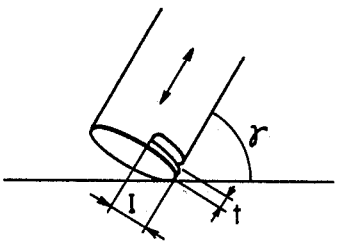
FIG. 6 shows the construction of the tip end of the drive source shown in FIG. 1.

FIG. 6 is an enlarged view of the tip end portion of each drive source 6, 7, 8. As shown, a slit is provided in that portion of each drive source which contacts the floor surface, in order to mechanically effect compound resonance and increase the amplitude. In the confirmative experiment in the present invention, a cut-in was provided so as to form a piece having a thickness (t) of about 1 mm and a length (l) of about 5 mm in that portion of the tip end of a resonance cylinder of aluminum which contacts the floor surface, whereby a good result was obtained. Also, assuming that the mounting angle of the drive sources provided with said cut-in relative to the floor surface is $\gamma$, the movement speed was characterized by the following features:

For $\gamma = 80°-50°$, the movement speed was fast on a paper surface, and was slow on a metal plate; and For $\gamma = 30°-10°$, the movement speed was zero on a paper surface, and was fast on a metal plate.

Accordingly, the mounting angle may be selected to an optimum mounting angle depending on the floor surface.

An example of the drive control of the drive sources 6, 7 and 8 will now be described.

Figure 3:
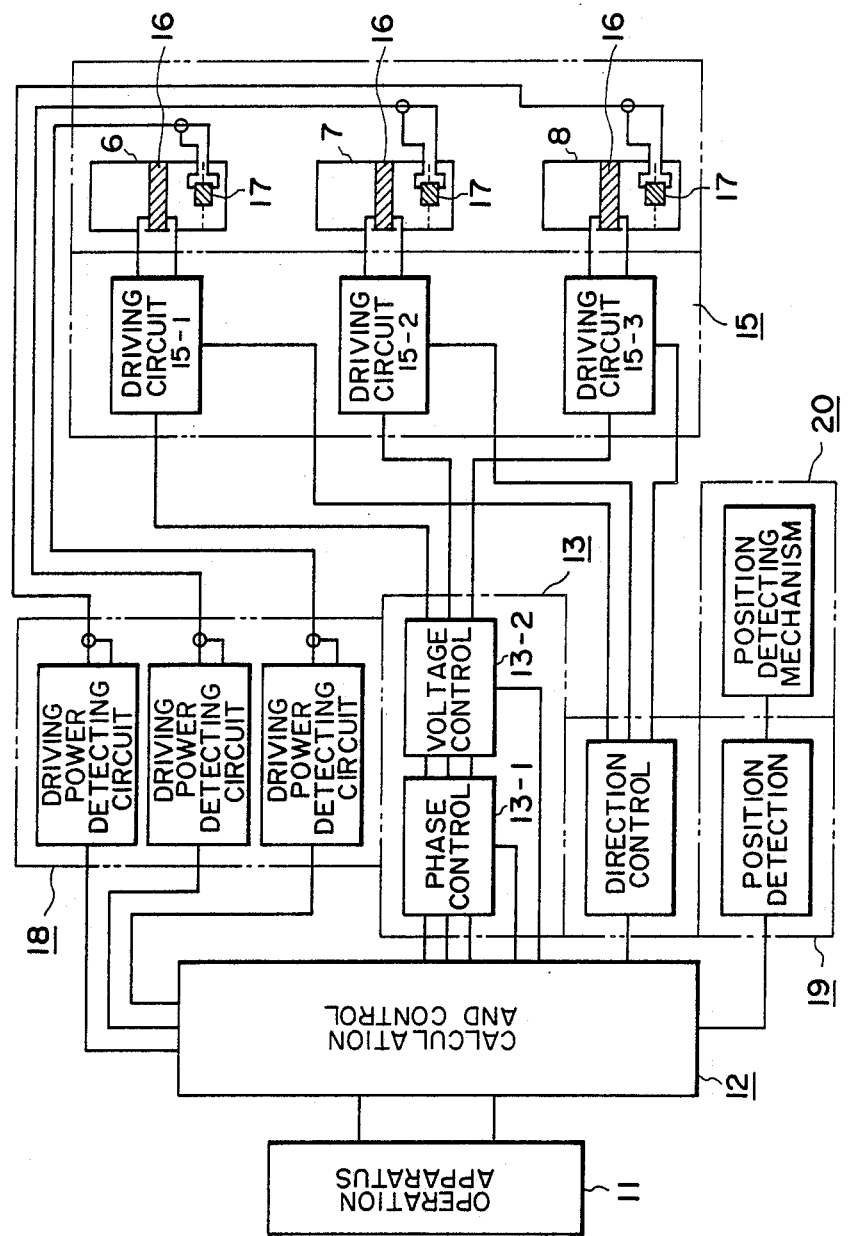
FIG. 3 block diagram showing an example of the control circuit of the FIG. 1 device.

FIG. 3 is a block diagram of a control circuit therefor. In FIG. 3, reference numeral 11 designates a command operation unit for providing operating commands by the operator. The command operation unit 11 gives input instructions by a key input, a handle or the like to give instructions as to the direction and speed. Reference numeral 12 denotes a calculation and control circuit for receiving the instruction signal from the command operation unit 11 and controlling circuits 13, 4, 15-18 to be described and the drive sources 6, 7 and 8. The calculation and control circuit 12 comprises a microcomputer. Reference numeral 13 designates a circuit for controlling the movement speeds of the drive sources 6, 7 and 8 when the drive sources are electrically driven. Reference numeral 14 denotes a direction control circuit for determining the direction in which the drive sources are moved. Reference numeral 15 designates a high frequency driving circuit for driving a vibrator 16 incorporated in the drive sources 6, 7 and 8. Reference numeral 16 denotes a vibrator for vibrating the drive sources 6, 7 and 8. The vibrator 16 may be, for example, PZT or the like of a piezo-electric element, as previously mentioned. Reference numeral 17 designates a mechanical vibration-electrical signal converting element (PZT or the like), i.e., a sensor for detecting both a vibration produced by the vibrator 16 incorporated in the drive sources 6, 7 and 8 and a vibration caused by said vibration being repulsed by the floor, converting said vibrations into an electrical signal, detecting how much said first-mentioned vibration has beaten against the floor, and feeding back the detection signal to the calculation and control circuit 12.

Reference numeral 18 denotes a driving power detecting circuit for amplifying the signal detected by sensor 17, and supplying to the calculation and control circuit 12 the information as to how great a force has been applied.

The operation of the driving device will now be described. For example, let it be assumed that this device is moved in the direction of $\vec{a}$ in FIG. 1A. That is, when the device is moved with the drive source 6 being set as the fore portion and the drive sources 7 and 8 being set as the rear portion, if the drive sources 7 and 8 are vibrated at the same level to thereby beat against the floor, a force opposite in direction to $\vec{a}$ and $\vec{c}$ is applied to the moving table 1 by the reaction force resulting therefrom and the moving table is moved in the direction of $\vec{a}$. At this time, the drive source 6 is kept unvibrated. This movement may be stopped simply by stopping the vibration of the drive sources 7 and 8, but in some cases, such movement is not stopped highly accurately due to the reverberation of the vibration of the drive sources 7 and 8 or due to inertia. Accordingly, the drive source 6 can be vibrated to act as a brake, and a vector opposite to the direction of advance can be imparted to apply sudden braking, thereby stopping the moving table at a desired position. To move the moving table in a direction bent upwardly of $\vec{a}$, if either the vibration of the drive source 8 is stopped or the level of the vibration thereof is reduced and the vibration of the drive source 7 is continued, or the level of the vibration is intensified and the vector direction of the moving table 1 is bent, the moving table will be moved in the direction bent upwardly of $\vec{a}$. Also, when the moving table is to be moved in the opposite direction, i.e., in a direction bent downwardly of $\vec{a}$, if vibration is imparted to the drive sources 7 and 8 in a manner converse to what has been described just above, the moving table will be moved in the direction bent downwardly of $\vec{a}$.

The speed control circuit 13 can control, for example, the voltage level of the driving waveform which drives the vibrator, thereby controlling the level of the vibration and varying the speed.

Also, in the direction control circuit 14, the drive of the drive sources 6, 7 and 8 is controlled by the instruction input for the rightward direction or the leftward direction, whereby the direction is controlled. It is naturally conceivable that this circuit 14 is included in the circuit 12.

The sensor 17 detects by a bimorph sensor or the like the mechanical vibration produced by the force of the vibration caused by the repulsion force or the like from the floor, causes the driving power detecting circuit 18 to feed back to the calculation and control circuit 12 the degree of force with which the drive sources 6, 7 and 8 are beating against the floor, causes the computer program to determine whether the standard speed or not, and outputs a signal to the control circuit 13 to decrease the speed when the speed is greater than the standard speed and to increase the speed when the speed is less than the standard speed, thereby moving the moving table more accurately. If at that time, the phase of the vibration imparted to the drive sources and the phase until the drive sources float in the air and drop do not coincide with each other due to the conditions of the floor (the kind, the coefficient of friction, the temperature, etc. of the floor), the force will be lost. Also, the direction will sometimes not be fixed. Accordingly, phase control such as PLL is utilized so that the beating force may become maximum by the feedback information by the circuits 17 and 18 and that the direction may not become unfixed, and phase adjustment is done by a phase control circuit 13-1.

In this case, it is also possible to intentionally change the phase of the predetermined drive source and change the direction of movement.

Figure 1C:
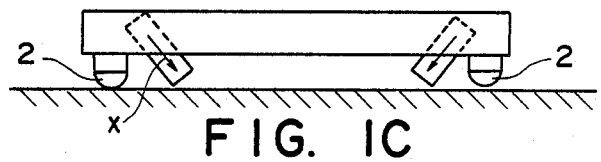
FIG. 1C is a front view showing another embodiment of the present invention.

Also, to move the moving table in various directions between the directions of $\vec{a}$, $\vec{b}$ and $\vec{c}$ such as intermediate directions between the directions of $\vec{a}$ and $\vec{c}$ in FIG. 1, if the drive sources 6, 7 and 8 are changed in direction by the control of the direction control circuit 14 and the phase and voltage control of the speed control circuit, the moving table can be moved with the direction thereof freely changed. If, for example, the moving table is to be moved in the upward direction perpendicular to the direction of $\vec{a}$ while remaining in the shape of FIG. 1, the vectors $\vec{a}$, $\vec{b}$ and $\vec{c}$ are detected by the driving power detecting blocks of the sensor 17 and circuit 18, and calculation is effected by the calculation and control block 12 to find the composite vector of $\vec{a}$, $\vec{b}$ and $\vec{c}$ and know the current direction, and then from that information, the drive sources 6, 7 and 8 are controlled by the control units 13 and 14 to impart a vector in a direction in which the moving table is to be moved. By the above-described construction, the moving table could be moved at about 40 cm/sec.

Figure 4:
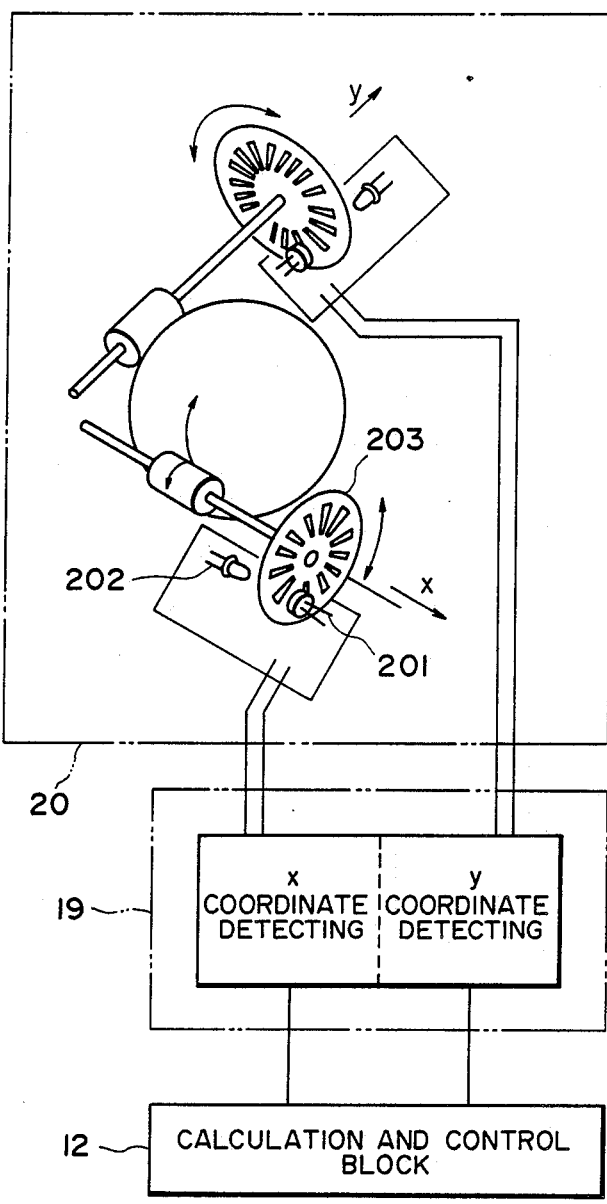
FIGS. 4 and 5 are circuit and block diagrams, respectively, showing an example of the position detecting mechanism shown in FIG. 3.

Reference numerals 19 and 20 designate circuits for detecting the position of the moving table and two-dimensionally detecting the coordinates from a reference point. For example, the circuits 19 and 20 can detect the two-dimensional current position from the reference point at a pulse number obtained from a photosensor 201 and an encoder 203 by a mechanism as shown in FIG. 4 being provided in the ball receivers 2', 3' and 4' receiving the balls 2, 3 and 4 of FIG. 1 therein. This position detection data (X, Y) is determined by the microcomputer 12 and compared with the desired position, and while the two differ from each other, the direction to the desired position is found and the drive sources 6–8 are ON-OFF-controlled to move the moving table in a desired direction.

Figure 5:
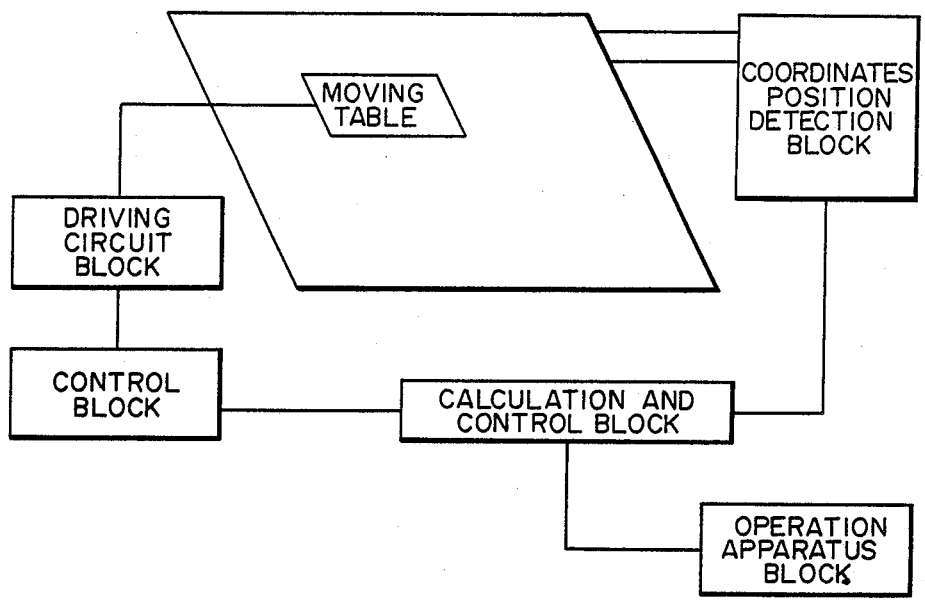

The two-dimensional position can also be detected by adopting a construction in which the moving table is moved on a tablet and moving the moving table 1 of FIG. 1 with a position detecting pen or the like attached thereto. For example, on a tablet of the electromagnetic induction type as shown in FIG. 5, the absolute position on the tablet is detected with a detecting pen being attached to the moving table, whereby the moving table 1 can be freely moved to a desired position on the basis of the instruction input in the control circuit of FIG. 3 placed on the moving table. Also, by fixing a recording ink pen onto the moving table 1, a desired character or figure can be recorded in conformity with the movement thereof, and by fixing an image reader using an original reading photosensor CCD onto the moving table 1, original reading becomes possible in conformity with the movement thereof.

Figure 9A:
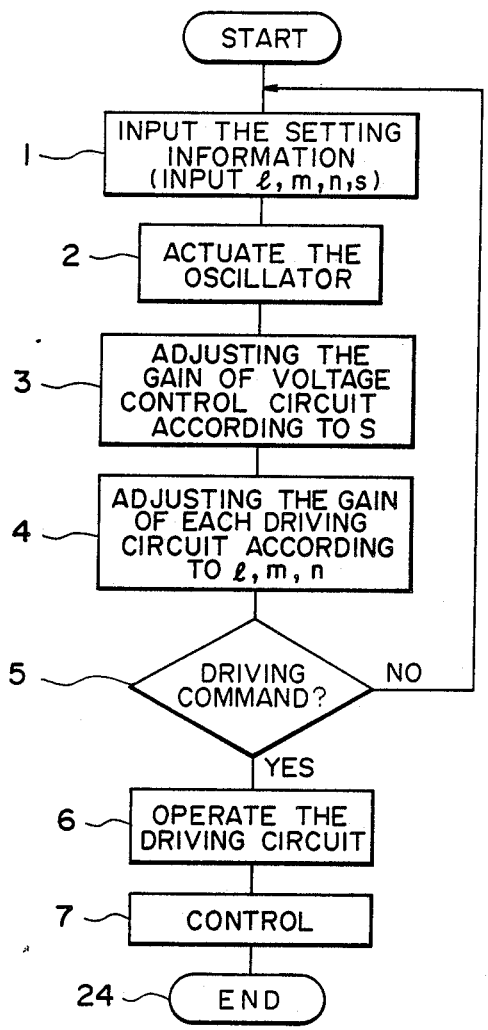
FIGS. 9A and 9B are program charts showing a program contained in the circulation and control circuit shown in FIG. 3.
Figure 9B:
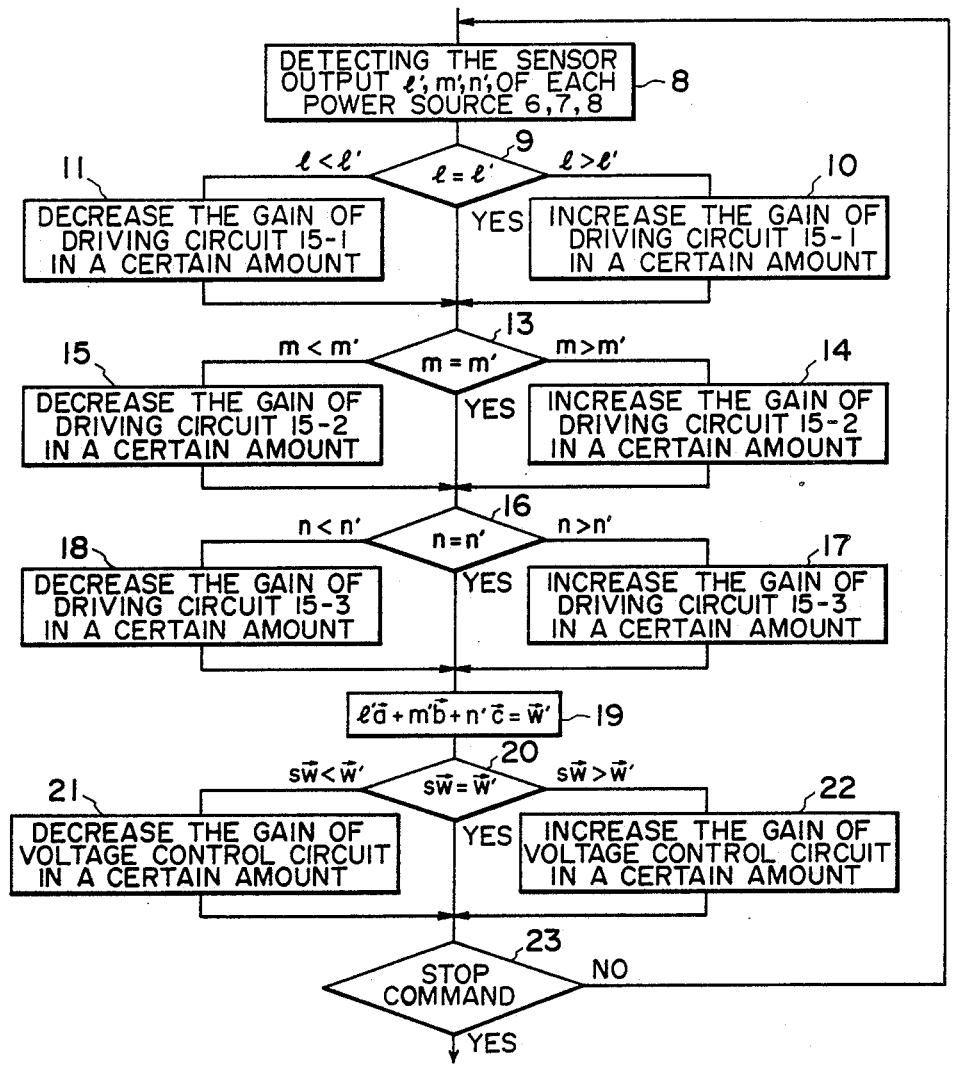

FIGS. 9A and 9B are program charts showing an example of the program of a computer as the calculation and control circuit 12. The operation of the circuit of FIG. 3 will hereinafter be described in accordance with this program.

Figure 10:
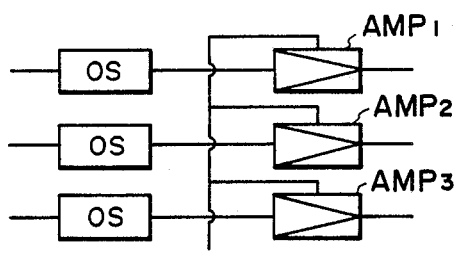
FIG. 10 a circuit diagram showing an example of the phase control circuit 13-1 and voltage control circuit 13-2 shown in FIG. 3.

The computer 12 operates from step 1, and at step 1, the set values l, m, n and s manually set in the operation apparatus 11 are input, and at step 2, the high frequency oscillator provided in the phase control circuit 13-1 is operated, and at step 3, the gain of the amplifier in the voltage control circuit 13-2 is adjusted according to the set information S. Referring now to FIG. 10 which is a circuit diagram showing an example of the phase control circuit 13-1 and the voltage control circuit, OS designates oscillators and $AMP_1$-$AMP_3$ denote amplifiers. At the above-described steps the gains of the amplifiers $AMP_1$-$AMP_3$ assume a value conforming to S, and the pulses of the oscillators OS which output pulses of the same frequency are amplified, whereafter amplification signals (frequency signals) are input to the driving circuits 15-1 to 15-3.

At step 4, the gains of the amplifiers which constitute the driving circuits 15-1 to 15-3 are set according to the set values l, m and n. At step 5, whether a driving command has been put out by the operation of the operation apparatus 11 is detected, and when the driving command has been put out, the program again returns to step 1. Also, when the driving command has been put out, the driving circuits 15-1 to 15-3 are driven at step 6. Thus, the driving circuits amplify the input frequency signals at the gains conforming to the set values l, m and n and drive the vibrator 16, and the drive sources 6-8 produce driving powers $l\vec{a}$, $m\vec{b}$ and $n\vec{c}$, respectively, and the moving table 1 is driven in a vector direction $\vec{W} = l\vec{a} + m\vec{b} + n\vec{c}$.

Step 7 is a control operation, the details of which are shown in FIG. 9B.

In the control operation of FIG. 9B, the outputs l', m' and n' of sensors 17 detected by the driving power detecting circuit are first detected at step 8. At step 9, the set value l and the detected output l' are compared with each other, and when l>l', at step 10, the gain of the driving circuit 15-1 is increased by a certain amount, and when l<l', at step 11, that gain is decreased by a certain amount, and when l=l', that gain is left as it is and the program shifts to step 13. Steps 13-15 are similar to steps 9-11, and at these steps, the gain of the driving circuit 15-2 is adjusted according to the result of the comparison between the detected m' and the set value m. Steps 16-18 likewise adjust the gain of the driving circuit 15-3 in accordance with the result of the comparison between n' and n. By said steps 8-18 being repeated, the gain is adjusted so that l=l', m=m' and n=n', and the moving table 1 can be accurately driven in the direction $l\vec{a} + m\vec{b} + n\vec{c}$.

At step 19, $l'\vec{a} + m'\vec{b} + n'\vec{c} = \vec{W}'$ is found on the basis of the detection outputs l', m' and n', and at step 20, $S\vec{W}$ and $\vec{W}'$ are compared with each other. In conformity with the result of this comparison, when $S\vec{W} < \vec{W}'$, step 21 is executed, and when $S\vec{W} > \vec{W}'$, step 22 is executed, and by these steps 20-22 being repeated, the gain of the voltage control circuit 13-2 is set so that $S\vec{W} = \vec{W}'$, and the driving speed conforms to the set value S. At step 23, whether a stop command has been put out from the operation apparatus 11 is detected, and when the stop command has been output, the program shifts to the stop 24 of FIG. 9A to stop the driving of the moving table 1, and when the stop command has not been output, the program shifts to step 8 and thus, the above-described operation is repeated and the moving table 1 is driven in directions comforming to the set values l, m and n at a speed conforming to the set value S.

Figure 7:
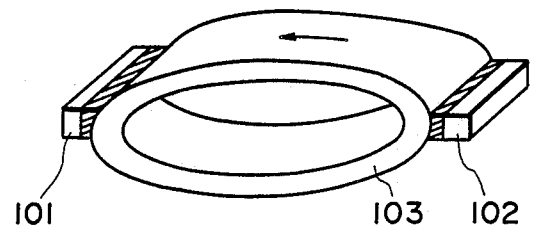
FIG. 7 shows another example of the drive source.
Figure 8:
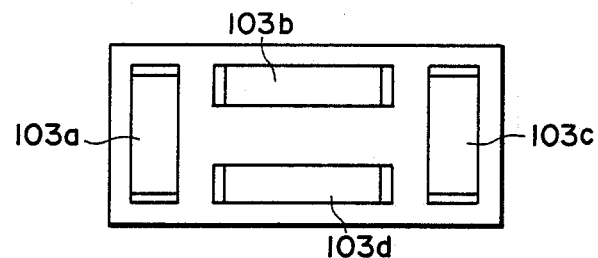
FIG. 8 is a bottom view of a driving device using the drive sources of FIG. 7.

Description will now be made of an embodiment based on another driving principle. FIGS. 7 and 8 illustrate said another embodiment. Reference numerals 101 and 102 designate vibrators attached to a closed loop-like vibration propagating plate 103 to control the phase of the vibrations of the vibrators 101 and 102 and generate a travelling wave of planar waveform on the plate 103. Such units are mounted on the moving table as shown in FIG. 8 and the travelling waves of planar waveform of the respective units are suitably controlled, whereby the moving table can be two-dimensionally driven. That is, if the travelling waves are generated in the same direction, 103a and 103c can be rectilinearly moved in the direction of the travelling waves, and if the travelling waves are generated in opposite directions, 103a and 103c can be rotated to change the direction thereof. Also, if the directions of the travelling waves of 103a, 103b, 103c and 103d and the duty ratio are controlled, drive control in any direction will be possible.

In the foregoing, description has been made of a system in which a driving power generating mechanism is provided rearwardly of the position of the center of gravity of the moving member with respect to the direction of movement thereof and the moving member is driven by being pushed, but alternatively, the driving power generating mechanism may be provided forwardly of the position of the center of gravity of the moving member with respect to the direction of movement thereof and the moving member may be driven by being pulled.

In the present invention, the structure is simple and has no rotatively driving mechanism and thus, compactness, light weight and low cost of the device can be realized.

In the embodiments, a piezo-electric element is used as the vibrator, whereas an electrostrictive element may also be used instead of the piezo-electric element.

What is claimed is:

1. A driving device comprising:
   (a) a base plate
   (b) a plurality of drive sources disposed at different portions on said base plate, each of said plurality of drive sources having a vibrator adapted to vibrate upon application of an electrical signal thereto and causing relative movement between said base plate and a contact surface contact surface by the vibration of each of said vibrators;
   (c) sensor means respectively provided for each of said drive sources, each of said sensor means detecting the driving state of each said drive sources;
   (d) a first adjusting circuit respectively provided for each of said drive sources for individually adjusting the electrical signal applied to each of said drive sources on the basis of the output from said sensor means; and
   (e) a second adjusting circuit for adjusting a common electrical signal applied to all of the drive sources on the basis of combined outputs from all of the sensor means.

2. A driving device according to claim 1, wherein said vibrator is a piezo-electric element.

3. A driving device according to claim 1, wherein said first adjusting circuit adjusts the electrical signal by comparing the output of said sensor means with a preset value, the preset value of each of said first adjusting circuit being independently determined.

4. A driving device according to claim 3, wherein said second adjusting circuit adjusts the electrical signal by comparing the combined outputs with a preset value.

5. A driving device according to claim 3, wherein said first adjusting circuit adjusts the electrical signal by comparing the output of said sensor means with a preset value, the preset value of each of said first adjusting circuit being independently determined.

6. A driving device according to claim 5, wherein said second adjusting circuit adjusts the electrical signal by comparing the combined outputs with a preset value.

7. A driving device comprising:
   (a) a base plate; and
   (b) a drive source disposed on said base plate, said drive source having a vibrator adapted to vibrate upon application of an electrical signal thereto and imparting a force to a contact surface by the vibration of said vibrator, said drive source contacting the contact surface at a predetermined inclination angle, a slit being provided in said drive source at a portion near the contact surface in a direction perpendicular with the vibration direction of said drive source.

8. A driving device according to claim 7, wherein said drive source has a cylindrical shape.

9. A driving device according to claim 7, wherein a portion of a circular edge of an end of said drive source is in contact with the contact surface, and said slit is provided in parallel with a flat base surface of the end of said drive source in contact with the contact surface.

10. A driving device according to claim 7, wherein a plurality of drive sources are provided on said base plate.

11. A driving device comprising:
(a) a base plate;
(b) a plurality of drive sources disposed at different portions on said base plate, each of said drive sources having a vibrator adapted to vibrate upon application of an electrical signal thereto and to impart a reaction force from a contact surface to said base plate;
(c) sensor means for outputting a signal upon detection of said reaction force, said sensor means being provided proximate to said drive means;
(d) a first adjusting circuit respectively provided for each of said drive sources for individually adjusting the electrical signal applied to each of said drive sources on the basis of the output from said sensor means; and
(e) a second adjusting circuit for combining the outputs from said sensor means and for adjusting the electrical signal applied to each of said drive sources.

12. A driving device according to claim 11, wherein each said vibrator is a piezoelectric element.

* * * * *

UNITED STATES PATENT AND TRADEMARK OFFICE
CERTIFICATE OF CORRECTION

PATENT NO. : 4,953,413

DATED : September 4, 1990

INVENTOR(S) : IWATA ET AL.

It is certified that error appears in the above-identified patent and that said Letters Patent is hereby corrected as shown below:

ON THE TITLE PAGE:

At [56] References Cited
U.S. PATENT DOCUMENTS

Change "Staufenberger, Jr. et al." to --Staufenberg, Jr. et al.--

COLUMN 1,
    Line 29, "whereby," should read --whereby--.

COLUMN 2,
    Line 30, "Fig." should read --Figs.--; and
    Line 39, "plan" should read --a plan--.

COLUMN 4,
    Line 29, "4," should read --14,--; and
    Line 66, "$\vec{a}$ and $\vec{c}$" should read --$\vec{b}$ and $\vec{c}$--.

COLUMN 5,
    Line 40, "standard speed" should read --speed is standard--.

COLUMN 7,
    Line 31, "$\vec{n+c}$" should read --$n'\vec{c}$--; and
    Line 42, "stop 24" should read --step 24--.

COLUMN 8,
    Line 7, "mcchanism" should read --mechanism--; and
    Line 31, "said" should read --of said--.

UNITED STATES PATENT AND TRADEMARK OFFICE
CERTIFICATE OF CORRECTION

PATENT NO. : 4,953,413
DATED : September 4, 1990
INVENTOR(S) : IWATA ET AL.

It is certified that error appears in the above-identified patent and that said Letters Patent is hereby corrected as shown below:

COLUMN 10,
    Line 11, "combining the out" should read --adjusting a common electrical signal applied to all of the drive sources on the basis of combined outputs from all of the sensor means.--; and
    Lines 12-14 should be deleted.

Signed and Sealed this

Twenty-eighth Day of December, 1993

Attest:

BRUCE LEHMAN

*Attesting Officer*    *Commissioner of Patents and Trademarks*